United States Patent [19]

Janko

[11] 4,121,242

[45] Oct. 17, 1978

[54] VIDEO PROCESSOR PROVIDING SYNC STRIPPING AND REINSERTION

[76] Inventor: Mike A. Janko, 2616 N. Ann Arbor, Apt. 117, Oklahoma City, Okla. 73127

[21] Appl. No.: 678,556

[22] Filed: Apr. 20, 1976

[51] Int. Cl.² .................... H04N 5/76; H04N 9/46; H04N 5/04; H04N 5/78
[52] U.S. Cl. ..................................... 358/4; 358/19; 358/152; 360/11; 360/37; 358/8
[58] Field of Search ................ 360/11, 37, 35; 358/4, 358/152, 127, 19, 148, 150, 8

[56] References Cited

U.S. PATENT DOCUMENTS

| | | | |
|---|---|---|---|
| 3,470,315 | 9/1969 | Kihara | 360/11 |
| 3,718,755 | 2/1973 | Crosno | 360/11 X |
| 3,931,638 | 1/1976 | Lentz | 360/37 X |
| 4,005,473 | 1/1977 | Hjortzberg | 358/4 |
| 4,015,289 | 3/1977 | Kinjo et al. | 360/11 |

Primary Examiner—John C. Martin
Assistant Examiner—Aristotelis M. Psitos
Attorney, Agent, or Firm—Dunlap, Codding & McCarthy

[57] ABSTRACT

A video processor for processing a video input signal provided by a skip-field video tape playback assembly, the video processor stripping the vertical sync pulses from the video input signal, generating interlaced video sync pulses, and adding the interlaced vertical sync pulses to the stripped video input signal to provide a video output signal having interlaced vertical sync pulses. Additional apparatus is disclosed to replace the horizontal sync pulses, the horizontal and vertical blanking pulses and the color bursts of the video input signal.

5 Claims, 1 Drawing Figure

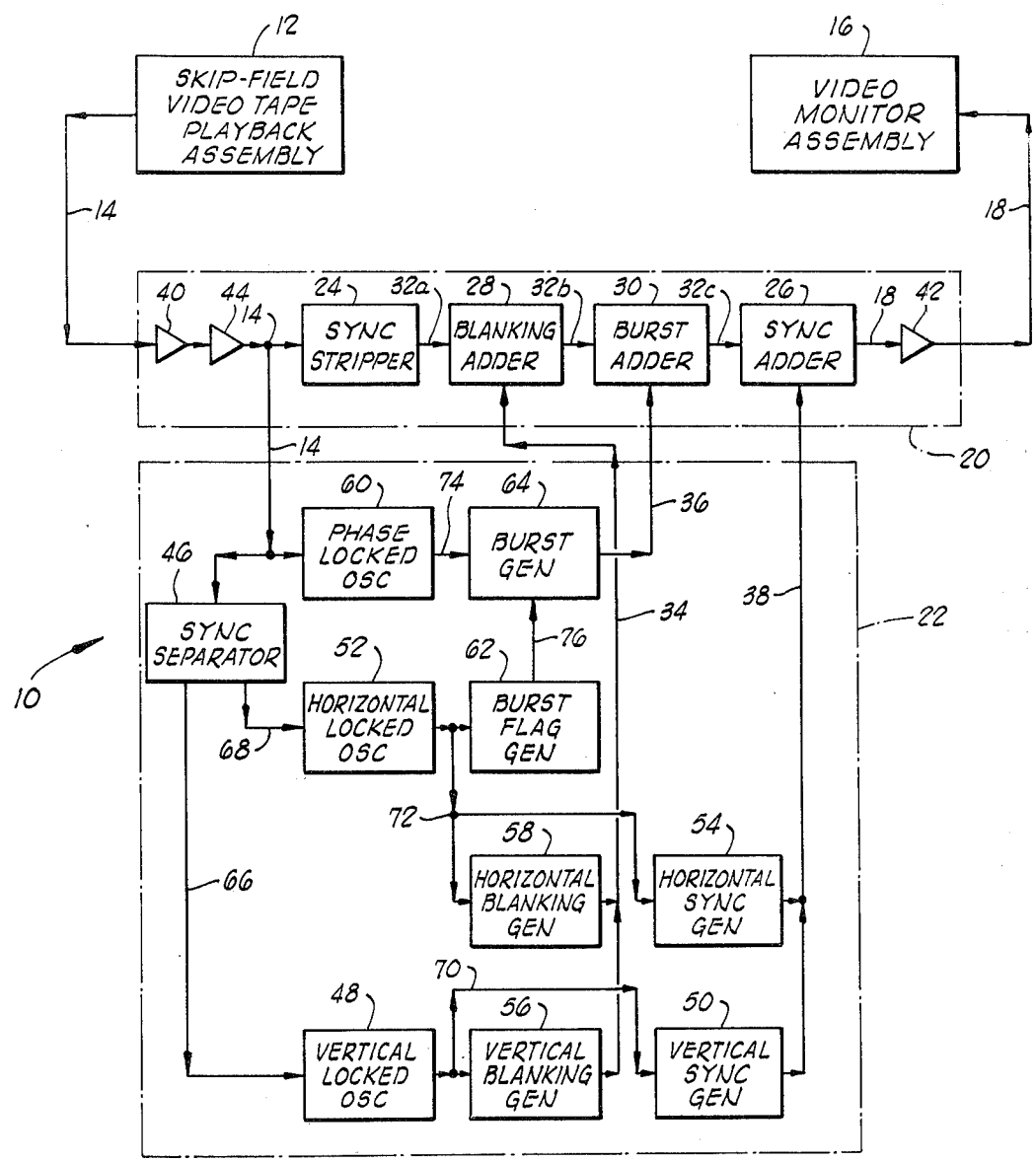

VIDEO PROCESSOR PROVIDING SYNC STRIPPING AND REINSERTION

BACKGROUND OF THE INVENTION

1. Field of the Invention

This invention relates generally to improvements in video processors and, more particularly, but not by way of limitation, to a video processor for processing a video input signal provided by a skip-field video tape playback assembly, the video processor replacing the non-interlaced vertical sync pulses of the video input signal with interlaced vertical sync pulses.

2. Description of the Prior Art

Skip-field video tape recording and playback apparatus suitable for use with the present invention is disclosed in the following U.S. Pat. Nos.: 3,359,365, issued to Kaihara; 3,391,248, issued to Hirota; 3,470,315, issued to Kaihara; and 3,700,798, issued to Sluys et al. Such apparatus are generally unsatisfactory since the video signals provided thereby do not contain interlaced vertical sync pulses with the result that the fields comprising each frame are superimposed rather than offset.

Additional related apparatus are shown in the following U.S. Pat. Nos.: Re. 27,371, issued to Okamura; 3,539,712, issued to Stephens; 3,555,177, issued to Tyler; 3,678,186, issued to Narita; and 3,662,101, issued to Segerstrom.

SUMMARY OF THE INVENTION

The present invention contemplates a video processor for processing a video input signal provided by a skip-field video tape playback assembly, the video processor replacing the non-interlaced vertical sync pulses of the video input signal with interlaced vertical sync pulses.

An object of the invention is to provide a video processor for processing a video input signal provided by a skip-field video tape playback assembly, the video processor replacing the non-interlaced vertical sync pulses of the video input signal with interlaced vertical sync pulses.

Another object of the invention is to provide a method for replacing the non-interlaced vertical sync pulses of a skip-field recorded video signal with interlaced vertical sync pulses.

A further object of the invention is to provide a video processor for processing a video input signal provided by a skip-field video tape playback assembly, the video processor replacing the vertical sync and blanking pulses, and the horizontal sync and blanking pulses of the video input signal with interlaced vertical sync pulses, new horizontal sync pulses and new vertical and horizontal blanking pulses.

A still further object of the invention is to provide a video processor for processing a color video input signal provided by a skip-field video tape playback assembly, the video processor replacing the vertical sync and blanking pulses, horizontal sync and blanking pulses and color bursts of the video input signal with interlaced vertical sync pulses and new horizontal sync pulses, vertical and horizontal blanking pulses and color bursts.

Other objects and advantages of the invention will be evident from the following detailed description when read in conjunction with the accompanying drawing which illustrates the preferred embodiment of the present invention.

BRIEF DESCRIPTION OF THE DRAWING

The drawing illustrates in schematic form a video processor constructed in accordance with the preferred embodiment of the present invention.

DESCRIPTION OF THE PREFERRED EMBODIMENT

Shown in the drawing and referred to therein by the reference number 10 is a video processor constructed in accordance with the preferred embodiment of the present invention. The video processor 10 is designed to process a video input signal provided by a skip-field video tape playback assembly 12 via a signal path 14, and provide a video output signal having interlaced vertical sync pulses for application to a video monitor assembly 16 or the like via a signal path 18. In the preferred embodiment, the video processor 10 also replaces the normally distorted horizontal sync pulses and the vertical and horizontal blanking pulses of the video input signal with new horizontal sync pulses and new vertical and horizontal blanking pulses. Assuming hereinafter that the skip-field tape playback assembly 12 provides a color video input signal, then the preferred video processor 10 will also replace the color bursts of the video input signal with new color bursts.

The video processor 10 is comprised generally of a video processing amplifier 20 and a sync generator 22. The video processing amplifier 20 is constructed to receive the video input signal provided by the skip-field video tape playbacks assembly 12 and interlaced vertical sync pulses provided by the sync generator, and replace the vertical sync pulses of the received video input signal with the received interlaced vertical sync pulses to provide the video output signal having interlaced vertical sync pulses. The sync generator 22 is constructed to detect a vertical synchronizing signal which is usually a portion of the video input signal provided by the skip-field video tape playback assembly 12, and provide the interlaced vertical sync pulses in response to the detected vertical synchronizing signal. Although in a preferred embodiment, the vertical synchronizing signal is derived directly from the video input signal via detection of the vertical sync pulses present therein, it is to be understood that the vertical synchronizing signal may be provided by other well known means, such as direct connection to the vertical reference signals produced internally in the skip-field video tape playback assembly 12.

The video processing amplifier 20 is comprised primarily of a sync stripper 24 and a sync adder 26. In the preferred embodiment, the video processing amplifier 20 also includes a blanking adder 28 and a burst adder 30. The sync stripper 24 is connected to the skip-field video tape playback assembly 12 via the signal path 14, the sync stripper 24 receiving the video input signal provided by the skip-field video tape playback assembly 12 and operating in a conventional manner to strip the vertical sync pulses from the received video input signal to provide a stripped video signal via a signal path 32a. In the preferred embodiment, the sync stripper 24 also operates to strip the horizontal sync pulses and the horizontal and vertical blanking pulses from the received video input signal. When the video input signal provided by the skip-field video tape playback assembly 12 is a color video input signal, it is desirable that the sync stripper 24 also operate to strip the color bursts from the received video input signal.

The stripped video signal provided by the sync stripper 24 is connected to and received by the blanking adder 28 via the signal path 32a, the blanking adder 28 being interposed generally between the sync stripper 24 and the sync adder 26. The blanking adder 28 also receives vertical and horizontal blanking pulses via a signal path 34. The blanking adder 28 operates in a conventional manner to add the received vertical and horizontal blanking pulses to the received stripped video signal to provide the stripped video signal for application to the sync adder 26 via a signal path 32b and the burst adder 30, if present.

The stripped video signal provided by the blanking adder 28 is connected to and received by the burst adder 30 via the signal path 32b, the burst adder 30 being interposed generally between the blanking adder 28 and the sync adder 26. The burst adder 30 also receives color bursts via a signal path 36. The burst adder 30 operates in a conventional manner to add the received color bursts to the received stripped video signal to provide the stripped video signal for application to the sync adder 26 via the signal path 32c.

The stripped video signal provided by the burst adder 30 is connected to and received by the sync adder 26 via the signal path 32c. The sync adder 26 also receives interlaced vertical sync pulses via a signal path 38. The sync adder 26 operates in a conventional manner to add the received interlaced vertical sync pulses to the received stripped video signal to provide a video output signal having interlaced vertical sync pulses for application to the video monitor assembly 16 via the signal path 18.

In the preferred embodiment, an input buffer 40 having high input impedance and low output impedance is interposed in the signal path 14 generally between the skip-field video tape playback assembly 12 and the sync stripper 24. In addition, an output buffer 42 having high input impedance and low output impedance is interposed in the signal path 18 generally between the sync adder 26 and the video monitor assembly 16. If desired, an amplifier 44 having gain greater than one (1) may be interposed in the signal path 14 generally between the input buffer 40 and the sync stripper 24 to amplify the video input signal for application to the other components of the video processor 10.

The sync generator 22 is comprised primarily of a sync separator 46, a vertical locked oscillator 48, and a vertical sync generator 50. In the preferred embodiment, the sync generator 22 also includes a horizontal locking oscillator 52, a horizontal sync generator 54, a vertical blanking generator 56, a horizontal blanking generator 58, a phase locked oscillator 60, a burst flag generator 62, and a burst generator 64. The sync separator 46 is connected to the skip-field video tape playback assembly 12 via the signal path 14, the sync separator 46 receiving the video input signal provided by the skip-field video tape playback assembly 12 and operating in a conventional manner to detect the vertical sync pulses of the received video input signal and to provide a vertical sync signal via a signal path 66 in response to detecting the vertical sync pulses of the received video input signal. In the preferred embodiment, the sync separator 46 also operates to detect the horizontal sync pulses of the received video input signal and provide a horizontal sync signal via a signal path 68 in response to detecting the horizontal sync pulses of the received video input signal.

The vertical sync signal provided by the sync separator 46 is connected to and received by the vertical locked oscillator 48 via the signal path 66. The vertical locked oscillator 48 operates in a conventional manner to provide an output signal via a signal path 70 in phase with the received vertical sync signal.

The vertical locked oscillator output signal is connected to and received by the vertical sync generator 50 via the signal path 70. The vertical sync generator 50 operates in a conventional manner to provide interlaced vertical sync pulses for application to the sync adder 26 connected thereto via the signal path 38, in response to receiving the vertical locked oscillator output signal.

The horizontal sync signal provided by the sync separator 46 is connected to and received by the horizontal locked oscillator 52 via the signal path 68. The horizontal locked oscillator 52 operates in a conventional manner to provide an output signal via a signal path 72 in phase with the received horizontal sync signal.

The horizontal locked oscillator output signal is connected to and received by the horizontal sync generator 54 via the signal path 72. The horizontal sync generator 54 operates in a conventional manner to provide horizontal sync pulses for application to the sync adder 26 connected thereto via the signal path 38, in response to receiving the horizontal locked oscillator output signal.

The vertical locked oscillator output signal is also connected to and received by the vertical blanking generator 56 via the signal path 70. The vertical blanking generator 56 operates in a conventional manner to provide vertical blanking pulses for application to the blanking adder 28 connected thereto via the signal path 34, in response to receiving the vertical locked oscillator output signal.

The horizontal locked oscillator output signal is also connected to and received by the horizontal blanking generator 58 via the signal path 72. The horizontal blanking generator 58 operates in a conventional manner to provide horizontal blanking pulses for application to the blanking adder 28 connected thereto via the signal path 34, in response to receiving the vertical locked oscillator output signal.

The video input signal provided by the skip-field video tape playback assembly 12 is also connected to and received by the phase locked oscillator 60 via the signal path 14. The phase locked oscillator 60 operates in a conventional manner to detect the color bursts of the received video input signal and provide an output signal via a signal path 74 in phase with the detected color bursts of the received video input signal.

The horizontal locked oscillator output signal is also connected to and received by the burst flag generator 62 via the signal path 72. The burst flag generator 62 operates in a conventional manner to provide burst flags via a signal path 76 in response to receiving the horizontal locked oscillator output signal.

The phase locked oscillator output signal and the burst flags are connected to and received by the burst generator 64 via the signal paths 74 and 76, respectively. The burst generator 64 operates in a conventional manner to provide color bursts for application to the burst adder 30 connected thereto via the signal path 36, in phase with the received phase locked oscillator output signal in response to receiving each burst flag.

Changes may be made in the construction and the arrangement of the parts or the elements of the various embodiments as disclosed herein without departing from the spirit of the invention as defined in the following claims.

What is claimed is:

1. A video processor for processing a video input signal provided by a skip-field video tape playback assembly and providing a video output signal having interlaced vertical sync signals, the processor comprising:
- a video processing circuit connected to the skip-field video tape playback assembly, the video processing circuit receiving the video input signal and interlaced vertical sync pulses, and replacing the vertical sync pulses of the received video input signal with the received interlaced vertical sync pulses to provide the video output signal having interlaced vertical sync pulses; and
- a sync generator connected to the skip-field video tape playback assembly and to the video processing circuit, the sync generator receiving the video input signal, detecting the vertical sync pulses of the received video input signal and providing the interlaced vertical sync pulses in response to detecting the vertical sync pulses of the received video input signal.

2. A video processor for processing a video input signal provided by a skip-field video tape playback assembly and providing a video output signal having interlaced vertical sync signals, the video processor comprising:
- a video processing circuit connected to the skip-field video tape playback assembly, the video processing circuit receiving the video input signal and interlaced vertical sync pulses, and replacing the vertical sync pulses of the received video input signal with the received interlaced vertical sync pulses to provide the video output signal having interlaced vertical sync pulses, comprising:
- a sync stripper connected to the skip-field video tape playback assembly, the sync stripper receiving the video input signal and stripping the vertical sync pulses from the received video input signal to provide a stripped video signal; and
- a sync adder connected to the sync stripper, the sync adder receiving the stripped video signal and interlaced vertical sync pulses, and adding the received interlaced vertical sync pulses to the received stripped video signals to provide a video output signal having interlaced vertical sync pulses; and
- a sync generator connected to the skip-field video tape playback assembly and to the video processing circuit, the sync generator receiving the video input signal, detecting the vertical sync pulses of the received video input signal and providing the interlaced vertical sync pulses in response to detecting the vertical sync pulses of the received video input signal, comprising:
  - a sync separator connected to the skip-field video tape playback assembly, the sync separator receiving the video input signal, detecting the vertical sync pulses of the received video input signal, and providing a vertical sync signal in response to detecting the vertical sync pulses of the received video input signal;
  - a vertical locked oscillator connected to the sync separator, the vertical locked oscillator receiving the vertical sync signal and providing an output signal in phase with the received vertical sync signal; and
  - a vertical sync generator connected to the vertical locked oscillator and to the sync adder, the vertical sync generator receiving the vertical locked oscillator output signal and providing the interlaced vertical sync pulses in response to receiving the vertical locked oscillator output signal.

3. The video processor of claim 2 wherein the sync stripper is further characterized as stripping the horizontal sync pulses from the received video input signal; wherein the sync adder is further characterized as receiving horizontal sync pulses and adding the receiving horizontal sync pulses to the received stripped video signal; wherein the sync separator is further characterized as detecting the horizontal sync pulses of the received video input signal and providing a horizontal sync signal in response to detecting the horizontal sync pulses to the received video input signal; and wherein the sync generator is further defined to include:
- a horizontal locked oscillator connected to the sync separator, the horizontal locked oscillator receiving the horizontal sync signal and providing an output signal in phase with the received horizontal sync signal; and
- a horizontal sync generator connected to the horizontal locked oscillator and to the sync adder, the horizontal sync generator receiving the horizontal locked oscillator output signal and providing the horizontal sync pulses in response to receiving the horizontal locked oscillator output signal.

4. The video processor of claim 3 wherein the sync stripper is further characterized as stripping the vertical and horizontal blanking pulses from the received video input signal; wherein the video processing circuit is further defined to include:
- a blanking adder interposed between the sync stripper and the sync adder, the blanking adder receiving the stripped video signal and vertical and horizontal blanking pulses, and adding the received vertical and horizontal blanking pulses to the received stripped video signal to provide the stripped video signal for application to the sync adder; and wherein the sync generator is further defined to include:
- a vertical blanking generator connected to the vertical locked oscillator and to the blanking adder, the vertical blanking generator receiving the vertical locked oscillator output signal and providing the vertical blanking pulses in response to receiving the vertical locked oscillator output signal; and
- a horizontal blanking generator connected to the horizontal locked oscillator and to the blanking adder, the horizontal blanking generator receiving the horizontal locked oscillator output signal and providing the horizontal blanking pulses in response to receiving the horizontal locked oscillator output signal.

5. The video processor of claim 3 wherein the video input signal is further characterized as being a color video input signal; wherein the sync stripper is further characterized as stripping the color bursts from the received video input signal; wherein the video processing circuit is further defined to include:
- a burst adder interposed between the blanking adder and the sync adder, the burst adder receiving the stripped video signal from the blanking adder and color bursts, and adding the received color bursts to the received stripped video signal to provide the stripped video signal for application to the sync adder; and wherein the sync generator is further defined to include:
a phase locked oscillator connected to the skip-field video tape playback assembly, the phase locked oscillator receiving the video input signal, detecting the color bursts of the received video input signal, and providing an output signal in phase with the detected color bursts of the received video input signal;
a burst flag generator connected to the horizontal locked oscillator, the burst flag generator receiving the horizontal locked oscillator output signal and providing burst flags in response to receiving the horizontal locked oscillator output signal; and
a burst generator connected to the phase locked oscillator and to the burst flag generator, the burst generator receiving the phase locked oscillator output signal and the burst flags, and providing the color bursts in phase with the received phase locked oscillator output signal in response to receiving each burst flag.

* * * * *